A. BOWERS.
DETACHABLE BICYCLE HANDLE BAR GRIP.
APPLICATION FILED JULY 3, 1916.

1,258,647. Patented Mar. 12, 1918.

Inventor:
Albert Bowers

UNITED STATES PATENT OFFICE.

ALBERT BOWERS, OF SOUTH BEND, INDIANA.

DETACHABLE BICYCLE-HANDLE-BAR GRIP.

1,258,647.      Specification of Letters Patent.      Patented Mar. 12, 1918.

Application filed July 3, 1916. Serial No. 107,426.

*To all whom it may concern:*

Be it known that I, ALBERT BOWERS, citizen of the United States, residing in the city of South Bend, county of St. Joseph, and State of Indiana, have invented a new and useful Detachable Bicycle-Handle-Bar Grip, of which the following is a specification.

My invention relates to improvements in detachable bicycle handle-bar grips, in which through a wedge action influenced by the operation of a screw threaded bolt or shank the coöperative parts of the handle-bar and handle proper are frictionally held in operative position.

The objects of my improvement are, first, to provide a grip with a durable and efficient clamp, said clamp being constructed throughout of metal. Second, to provide a clamp having positive means of guiding itself into the tubular handle-bar as described hereinafter. Third, to provide a grip with a clamp fitted with a nut so placed upon the screw or bolt as to prevent the said clamp from expanding when the grip is being drawn off the handle-bar, thus allowing the clamp to be drawn freely out of the handle-bar as hereinafter described.

In the accompanying drawing Figure 1 is a longitudinal section of my improved grip.

The different parts are designated by numerals: 1, is a grip preferably of wood which fits over the handle-bar 4; 2, is a covering preferably of rubber fitting tightly over the grip 1, and is held in place by a metal ferrule, 3, which clenches into a groove around the grip, 1.

The grip, 1, is bored out centrally through a portion of its length, to admit the handle-bar, 4.

From the end of this bore to the end of the grip, 1, is bored also centrally a smaller passage for the insertion of the threaded bolt, 6, a metal washer, 7, being interposed between the end of the grip, 1, and the head of the bolt, 6, to prevent the head of the bolt, 6, from cutting into the grip, 1.

5, is the expanding spring of flat metal. The spring, 5, is bent to form two extending arms. These arms are bent backwardly and forward to three times their thickness for a portion of their length forming the shoulders marked, 11, in Fig. 2.

Figure 1:
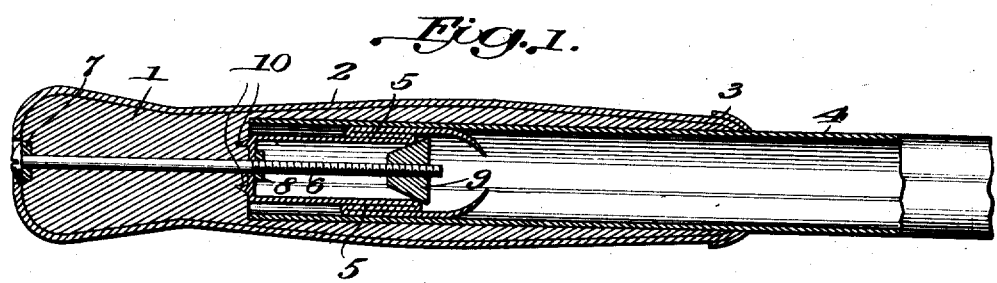
Figure 3:
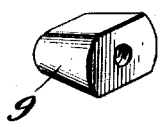
Fig. 3 is a perspective view of the wedge nut.
Figure 2:
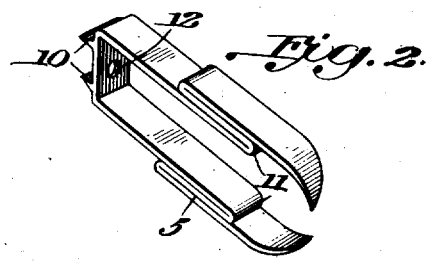
Fig. 2 is a perspective view of the expanding spring.
Figure 4:
Fig. 4 is a view of the threaded bolt showing a nut screwed to the end of the thread for the purpose hereinafter set forth.

The ends of the spring arms 5 are bent inward as shown in Figs. 1 and 2, for the purpose of guiding the spring 5 into the tubular handle bar, 4, when the grip is being attached to the handle-bar.

The spring, 5, is bored out centrally at the point marked 12 in Fig. 2 to admit the bolt, 6.

Two or more sharp projections, 10, are struck out from the base of the spring, 5, for the purpose hereinafter set forth.

9, is the wedge nut of either cast or sheet metal, fitting between the shoulders, 11, of the spring 5.

Two opposite tapering sides of the wedge nut, 9, which bear upon the shoulders 11, are flat and of the same width as the spring arms, 5, thus forming a wide bearing, preventing the turning of the wedge nut, 9, independently of the spring, 5.

The wedge nut, 9, is bored out centrally and threaded to admit the bolt, 6.

8 is a threaded nut screwed to the end of the thread on the bolt, 6, and securely tightened. The nut, 8, must be of a size that will turn with the bolt, 6, between the spring arms, 5, without striking said spring arms. When the grip, 1, is being drawn off the handle-bar 4, the spring 5 is drawn out of the tubular handle-bar, 4, by the nut, 8.

As will be readily seen without the nut, 8, the spring, 5, would be drawn out of the handle-bar, 4, by the wedge nut, 9. The wedge action of the nut, 9, would slightly expand the spring, 5, thus preventing the spring, 5, from drawing freely out of the handle-bar 4. The elimination of this difficulty being an important feature of my improvement.

In assembling the parts the spring, 5, is inserted into the grip, 1. The bolt, 6, is then inserted through the small passage in the end of the grip, 1, and through the spring, 5, a washer, 7, being interposed between the head of the bolt, 6, and the grip, 1. The nut, 8, is then screwed to the end of the thread on the bolt, 6, and securely tightened.

The wedge nut, 9, is then placed between the shoulders, 11. The bolt, 6, is then given a few turns by means of a screw-driver to start it into the wedge nut, 9. Thus the complete clamp consists of five parts: the spring, 5, the bolt, 6, the nut, 8, the wedge nut 9, and the washer, 7.

To attach the grip to the handle-bar, the end of said handle-bar, is inserted into the grip, 1. The ends of the spring arms, 5, being bent in as shown in the drawing, guide the clamp into the tubular handle-bar, 4, said handle-bar occupying the space between the spring, 5, and the interior of the grip, 1.

The screw, 6, is then turned thus drawing in the wedge nut, 9, and pressing the sharp projections 10 of the spring 5, into the grip, 1, thus locking the spring, 5, and grip 1 securely together.

When the bolt, 6, is turned drawing in the wedge nut, 9, the wedge action expands the spring arms, 5, against the interior of the tubular handle-bar, 4, thus frictionally holding the grip and the handle-bar firmly together.

I am aware that grips provided with clamps fitting inside of the tubular handle-bar, have been made previous to my invention, therefore I do not claim this combination broadly but I claim:—

1. A detachable bicycle handle-bar grip provided with a metal expanding clamp consisting of, a spring having two extending arms, their ends being bent inward for the purpose of guiding them into the tubular handle-bar, two opposite shoulders formed by bending the spring arms backward and forward to three times their thickness for a portion of their length, a tapering wedge nut fitting between said shoulders, a threaded bolt passing through the end of the grip and through the base of the expanding spring and into a threaded opening in the wedge nut, whereby, when the screw is turned drawing the wedge nut in and expanding the spring arms against the interior of the tubular handle-bar, the grip is frictionally held in operative position.

2. A detachable handle-bar grip as specified in claim 1 in which the threaded bolt passing through the end of the grip and through the base of the expanding spring is provided with a nut which clamps the expanding spring to the end of the grip.

I sign this specification in the presence of two subscribing witnesses this 24th day of June 1916.

ALBERT BOWERS.

Witnesses:
CLARENCE HOPPER,
WM. KELLEY.

Copies of this patent may be obtained for five cents each, by addressing the "Commissioner of Patents, Washington, D. C."